United States Patent
Ohtake et al.

(10) Patent No.: US 11,561,091 B2
(45) Date of Patent: Jan. 24, 2023

(54) DIMENSION MEASUREMENT METHOD USING PROJECTION IMAGE OBTAINED BY X-RAY CT APPARATUS

(71) Applicants: THE UNIVERSITY OF TOKYO, Tokyo (JP); MITUTOYO CORPORATION, Kanagawa (JP)

(72) Inventors: Yutaka Ohtake, Tokyo (JP); Tasuku Ito, Tokyo (JP); Tomonori Goto, Kanagawa (JP); Masato Kon, Kanagawa (JP)

(73) Assignees: THE UNIVERSITY OF TOKYO, Tokyo (JP); MITUTOYO CORPORATION, Kanagawa (JP)

( * ) Notice: Subject to any disclaimer, the term of this patent is extended or adjusted under 35 U.S.C. 154(b) by 39 days.

(21) Appl. No.: 16/455,883

(22) Filed: Jun. 28, 2019

(65) Prior Publication Data
US 2020/0011662 A1 Jan. 9, 2020

(30) Foreign Application Priority Data
Jul. 4, 2018 (JP) .............................. JP2018-127917

(51) Int. Cl.
*G01B 15/02* (2006.01)
*G01N 23/046* (2018.01)
(Continued)

(52) U.S. Cl.
CPC .......... *G01B 15/02* (2013.01); *G01N 23/046* (2013.01); *G01N 2223/401* (2013.01); *G01N 2223/633* (2013.01)

(58) Field of Classification Search
CPC ...... G01B 15/02; G01B 15/045; G01B 15/00; G01N 23/046; G01N 2223/401; G01N 2223/633
See application file for complete search history.

(56) References Cited

U.S. PATENT DOCUMENTS

| | | |
|---|---|---|
| 5,323,326 A | 6/1994 | Saito et al. |
| 5,550,376 A | 8/1996 | Gupta et al. |
| (Continued) | | |

FOREIGN PATENT DOCUMENTS

| | | |
|---|---|---|
| CN | 108109183 A | 6/2018 |
| JP | H03-115805 A | 5/1991 |
| (Continued) | | |

OTHER PUBLICATIONS

U.S. Appl. No. 16/455,912 to Yutaka Ohtake et al., filed Jun. 28, 2019.
(Continued)

*Primary Examiner* — John W Lee
(74) *Attorney, Agent, or Firm* — Greenblum & Bernstein, P.L.C.

(57) ABSTRACT

In measuring a dimension of an object to be measured W made of a single material, a plurality of transmission images of the object to be measured W are obtained by using an X-ray CT apparatus, and then respective projection images are generated. The projection images are registered with CAD data used in designing the object to be measured W. The dimension of the object to be measured W is calculated by using a relationship between the registered CAD data and projection images. In such a manner, high-precision dimension measurement is achieved by using several tens of projection images and design information without performing CT reconstruction.

12 Claims, 12 Drawing Sheets

(51) Int. Cl.
*G01B 15/04* (2006.01)
*G01B 15/00* (2006.01)

(56) References Cited

U.S. PATENT DOCUMENTS

| | | | |
|---|---|---|---|
| 2004/0068167 A1* | 4/2004 | Hsieh | G06T 7/0012 600/407 |
| 2005/0013471 A1* | 1/2005 | Snoeren | G06T 7/35 382/294 |
| 2005/0163278 A1 | 7/2005 | Metz et al. | |
| 2006/0140473 A1* | 6/2006 | Brooksby | G06T 7/33 382/285 |
| 2010/0254587 A1* | 10/2010 | Gundel | G06T 7/136 382/131 |
| 2011/0262024 A1 | 10/2011 | Bulitta et al. | |
| 2018/0325485 A1* | 11/2018 | Maslowski | A61B 6/483 |
| 2019/0223826 A1 | 7/2019 | Asano et al. | |
| 2019/0227004 A1 | 7/2019 | Ariga et al. | |

FOREIGN PATENT DOCUMENTS

| | | |
|---|---|---|
| JP | H04-274570 A | 9/1992 |
| JP | H09-005262 A | 1/1997 |
| JP | H10-122843 A | 5/1998 |
| JP | 2002-071345 A | 3/2002 |
| JP | 2004-012407 A | 1/2004 |
| JP | 2004-271222 A | 9/2004 |

OTHER PUBLICATIONS

Office Action issued in Chinese Counterpart Patent Appl. No. 201910600227.2, dated Mar. 1, 2022, along with an English translation thereof.

Japanese Office Action issued in Japanese Patent Application No. 2018-127917, dated Jul. 5, 2022, along with an English translation thereof.

Second Chinese Office Action issued in Chinese Patent Application No. 201910600227.2, dated Oct. 8, 2022, along with an English translation thereof.

* cited by examiner

DIMENSION MEASUREMENT METHOD USING PROJECTION IMAGE OBTAINED BY X-RAY CT APPARATUS

CROSS-REFERENCE TO RELATED APPLICATION

The disclosure of Japanese Patent Application No. 2018-127917 filed on Jul. 4, 2018 including specifications, drawings and claims is incorporated herein by reference in its entirety.

TECHNICAL FIELD

The present invention relates to a dimension measurement method using a projection image obtained by an X-ray CT apparatus. In particular, the present invention relates to a dimension measurement method that uses a projection image obtained by an X-ray CT apparatus and can achieve high-precision dimension measurement of an object to be measured made of a single material by using several tens of projection images and design information without performing CT reconstruction.

BACKGROUND ART

Medical X-ray CT apparatuses were put to practical use in the 1970s. Based on such techniques, X-ray CT apparatuses intended for industrial products emerged in the early 1980s. Since then, industrial X-ray CT apparatuses have been used to observe and inspect castings for voids, welded parts for poor welding, and circuit patterns of electronic circuit parts for defects that are difficult to check for by appearances. As 3D printers are becoming prevalent in recent years, demands not only for observation and inspection inside articles produced by 3D printers but also for 3D dimension measurement of internal structures and higher precisions are on the increase.

With the foregoing technical trends, measurement X-ray CT apparatuses are becoming prevalent mainly in Germany (see Japanese Patent Application Laid-Open Nos. 2002-071345 and 2004-012407). Such a measurement X-ray CT apparatus performs X-ray irradiation while rotating an object to be measured placed on the center of a rotating table.

FIG. 1 shows a configuration of a typical X-ray CT apparatus 1 used for measurement. An enclosure 10 shielding X-rays accommodates an X-ray source 12, an X-ray detector 14, a rotating table 16, and an XYZ movement mechanism unit 18. The X-ray source 12 emits a cone beam of X-rays 13. The X-ray detector 14 detects the X-rays 13. An object to be measured (for example, work) W is placed on the rotating table 16, and the rotating table 16 rotates the work W for CT imaging. The XYZ movement mechanism unit 18 is intended to adjust the position and magnification of the work W projected on the X-ray detector 14. The X-ray CT apparatus 1 further includes a controller 20 that controls such devices, and a control PC 22 that gives instructions to the controller 20 on the basis of user operations.

Aside from the control of the devices, the control PC 22 has a function of displaying a projection image of the work W projected on the X-ray detector 14 and a function of reconstructing a tomographic image from a plurality of projection images of the work W.

As shown in FIG. 2, the X-rays 13 emitted from the X-ray source 12 are transmitted through the work W on the rotating table 16 and reach the X-ray detector 14. The work W is rotated to obtain transmission images (projection images) of the work W in all directions by the X-ray detector 14. Reconstruction using a CT reconstruction algorithm such as a back projection algorithm and an iterative reconstruction algorithm is performed to generate a tomographic image of the work W.

The position of the work W can be moved by controlling X-, Y-, and Z-axes of the XYZ movement mechanism 18 and a θ-axis of the rotating table 16. The imaging range (position and magnification) and the imaging angle of the work W can thereby be adjusted.

To obtain a tomographic image or volume data (stereoscopic image or a set of tomographic images in the Z-axis direction) of the work W, which is the ultimate goal of the X-ray CT apparatus 1, a CT scan is performed on the work W.

The CT scan includes two processes, namely, acquisition of projection images of the work W and CT reconstruction. In the projection image acquisition process, the rotating table 16 on which the work W is placed is rotated either continuously at a constant speed or intermittently with a constant step width during X-ray irradiation, whereby projection images of the work W are obtained in all circumferential directions (at regular intervals). The obtained projection images in all circumferential directions (at regular intervals) are subjected to CT reconstruction using a CT reconstruction algorithm such as a back projection algorithm and an iterative reconstruction algorithm. As illustrated in FIG. 3, a tomographic image or volume data of the work (in FIG. 3, master balls) is thereby obtained.

The obtained volume data can be used to perform various measurements such as dimension measurement and defect analysis.

SUMMARY OF INVENTION

Technical Problem

As described above, X-ray CT based internal and external measurement of an object to be measured includes generating volume data (three-dimensional image) through CT reconstruction of a large number of projection images obtained by an X-ray CT apparatus, and performing measurement on the volume data. To generate volume data having resolution needed for measurement, several hundreds to several thousands of projection images are typically needed. With CT reconstruction time also taken into account, there has been a problem of needing a lot of time for measurement.

The present invention has been made in order to solve the above-described problem in the conventional technique, and an object thereof is to achieve high-precision dimension measurement of an object to be measured made of a single material by using several tens of projection images and design information without performing CT reconstruction.

Solution to Problem

The present invention solves the foregoing problem by, in measuring a dimension of an object to be measured made of a single material: obtaining a plurality of transmission images of the object to be measured by using an X-ray CT apparatus, and then generating respective projection images; registering the projection images with CAD (i.e., Computer Aided Design) data used in designing the object to be measured; and calculating the dimension of the object to be measured by using a relationship between the registered CAD data and projection images.

Here, a representative projection image group can be selected for the registered CAD data. Combinations of all projection values in the representative projection image group with transmission lengths estimated from the CAD data can be obtained. The dimension of the object to be measured can be calculated by using a relationship between the obtained projection values and the estimated transmission lengths.

An attenuation coefficient of an X-ray can be determined by using the registered CAD data so that a difference between a calculated thickness at a measurement point having a known thickness and a design value decreases. The dimension of the object to be measured can be calculated by using the attenuation coefficient.

The projection images and the CAD data can be registered by: determining barycentric positrons of the object to be measured in the respective projection images; calculating a three-dimensional barycentric position of the object to be measured by using the determined barycentric positions of the object to be measured in the respective projection images; determining a barycentric position of the object to be measured on the CAD data; making the barycentre positions of the object to be measured determined from the respective projection images coincide with the barycentric position of the object to be measured on the CAD data; and rotating the CAD data so that orientation of the object to be measured in one of the projection images coincides with that of the object to be measured on the CAD data.

The barycentric position of the object to be measured on the CAD data can be determined by assuming, for all mesh triangles, a set of triangular pyramids with a given point as apexes and the respective triangles as bases, and taking a weighted average of volumes and barycenters of the respective triangular pyramids.

Alternatively, the barycentric position of the object to be measured on the CAD data can be determined by using a solid model 3D-CAD software.

Orientation alignment by rotation of the CAD data can be performed by determining orientation about axes of the projection image by comparing moment of inertial while rotating the CAD data about the axes.

The axes may be a horizontal axis and a vertical axis.

Orientation alignment by rotation of the CAD data can be performed by rotating the CAD data so that contours coincide.

Orientation alignment by rotation of the CAD data can be performed by initially determining orientation about horizontal and vertical axes of the projection image by comparing moment of inertial while rotating the CAD data about the horizontal and vertical axes, and then rotating the CAD data within a plane of the projection image so that contours coincide.

The coincidence of the contours can be determined from a ratio R of an overlapping area Sa to an entire area Sb, i.e., R=Sa/Sb.

Advantageous Effects of Invention

According to the present invention, CT reconstruction does not need to be performed. This can significantly reduce time needed for measurement, and achieve internal and external measurement unaffected by shape errors resulting from a CT reconstruction algorithm.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An embodiment of the present invention will be described in detail below with reference to the drawings. It should be noted that the present invention is not limited to the description of the following embodiment or examples. Constituent features of the embodiment and examples described below include what are readily conceivable by those skilled in the art, what are substantially identical, and what are in the so-called range of equivalency. The components disclosed in the following embodiment and examples may be combined as appropriate or selected and used as appropriate.

Figure 4:
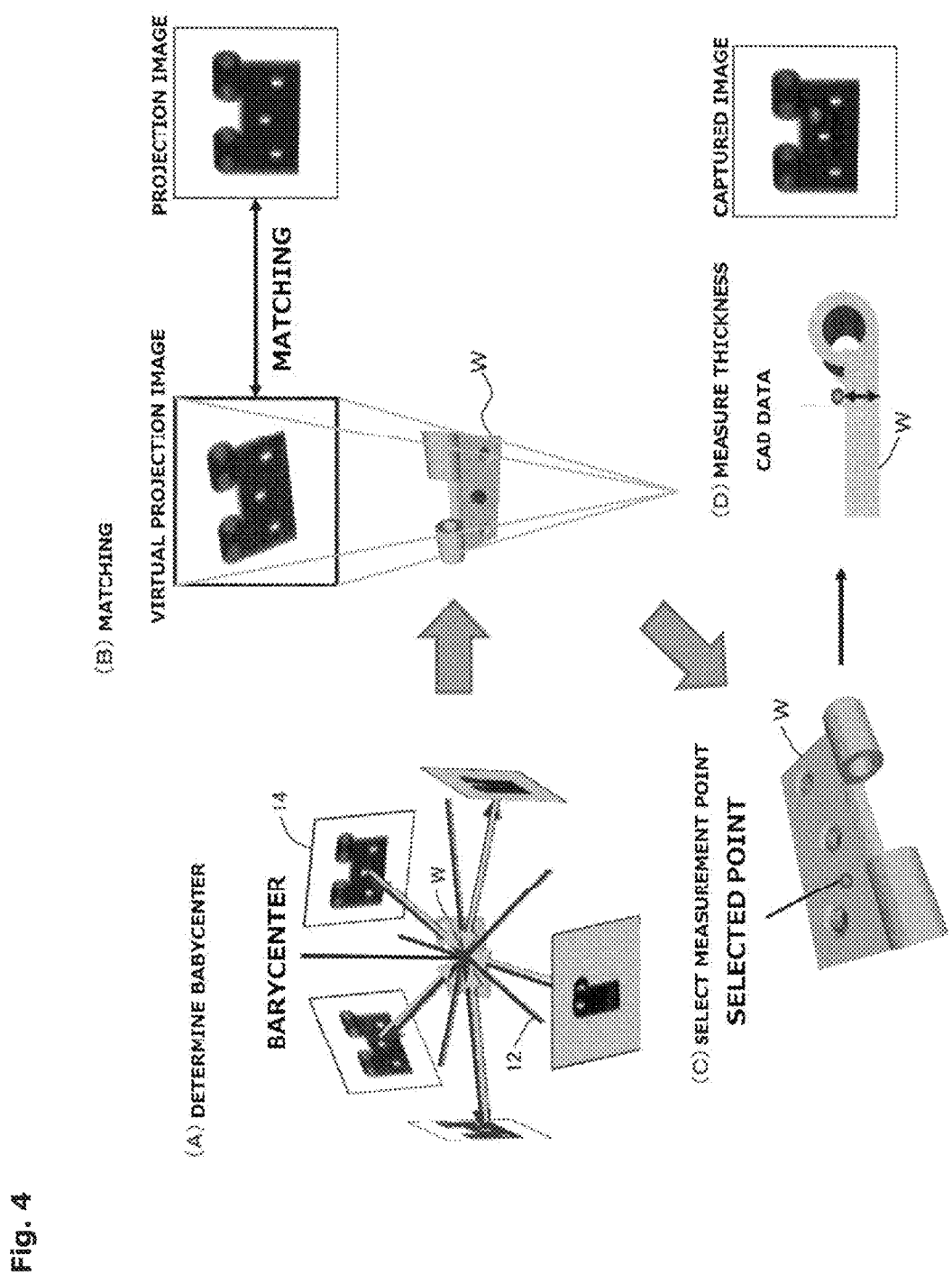
FIG. 4 is a diagram showing an outline of a calculation procedure according to an embodiment of the present invention.

FIG. 4 shows an outline of a calculation procedure according to the embodiment of the present invention.

In the present embodiment, (A) a barycenter is determined, and then (B) CAD data is rotated about x-, y-, and z-axes on a simulator to generate virtual projection images, followed by matching. Next, (C) a thickness measurement point is selected, and (D) the thickness is measured by using registered CAD data and a captured image.

Figure 5:
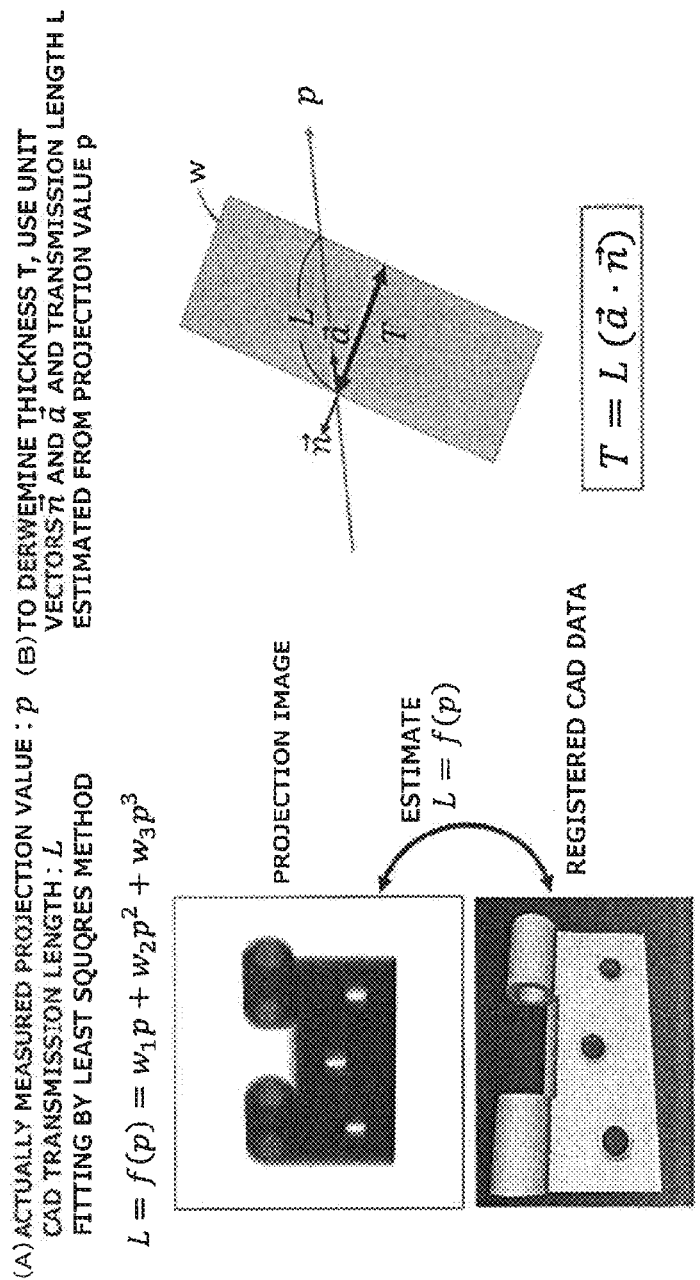
FIG. 5 is a diagram showing an outline of thickness measurement according to the embodiment.

For thickness measurement, as shown in FIG. 5, (A) a CAD transmission length L=f(p) (p is an actually measured projection value) is initially determined by fitting, for example, using a projection image and the registered CAD data based on the least squares method by the following equation:

[Eq. 1]
$$L=f(p)=w_1 p+w_2 p^2+w_3 p^3 \quad (1)$$

Next, (B) a thickness T is determined by using unit vectors n and a and the transmission length L estimated from the projection value p:

[Eq. 2]
$$T=L(\vec{a} \cdot \vec{n}) \quad (2)$$

Figure 6:
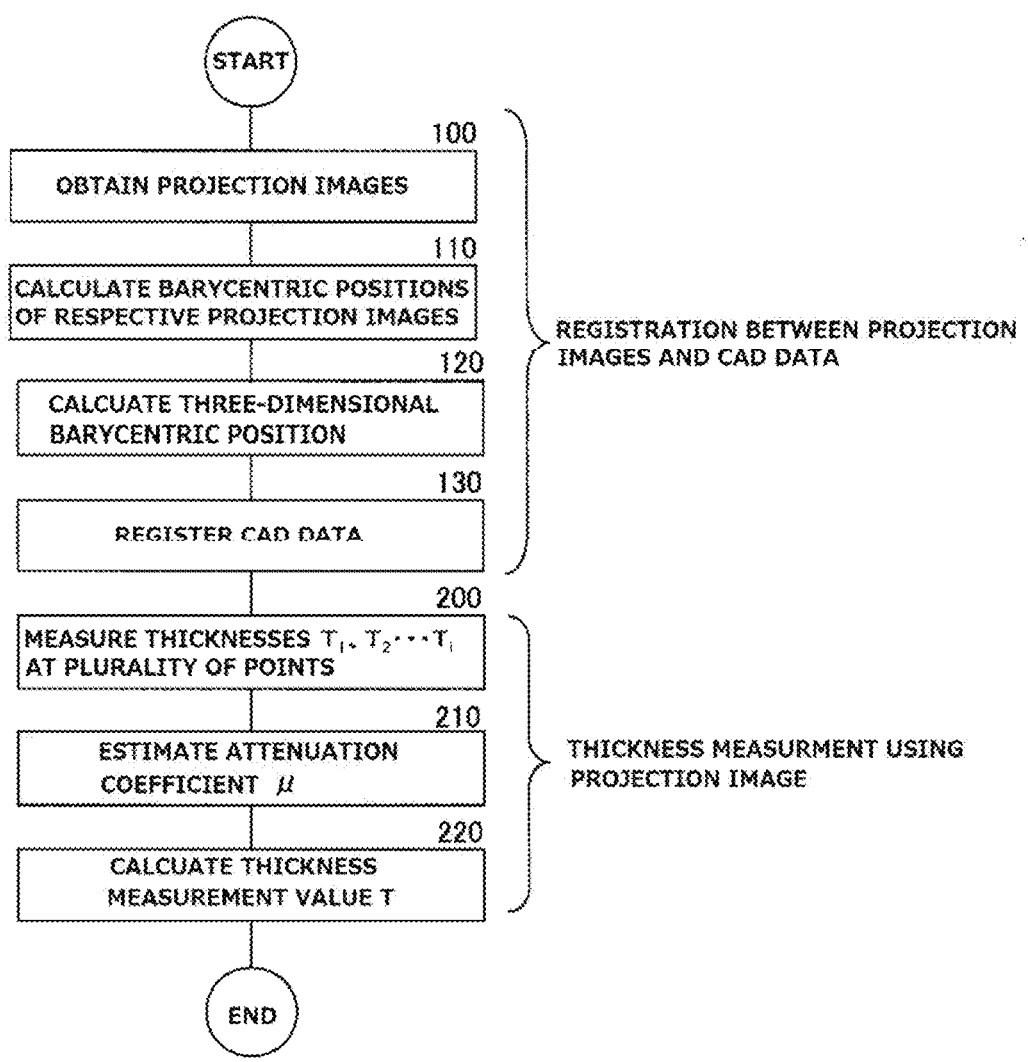
FIG. 6 is a flowchart showing a processing procedure according to the embodiment of the present invention.

FIG. 6 shows details of the processing procedure according to the present embodiment.

In the present embodiment, registration between projection images and CAD data is initially performed. The attenuation coefficient of an object to be measured is then estimated by using the projection images and design information about the CAD data, and the thickness of a measurement point is measured.

Figure 1:
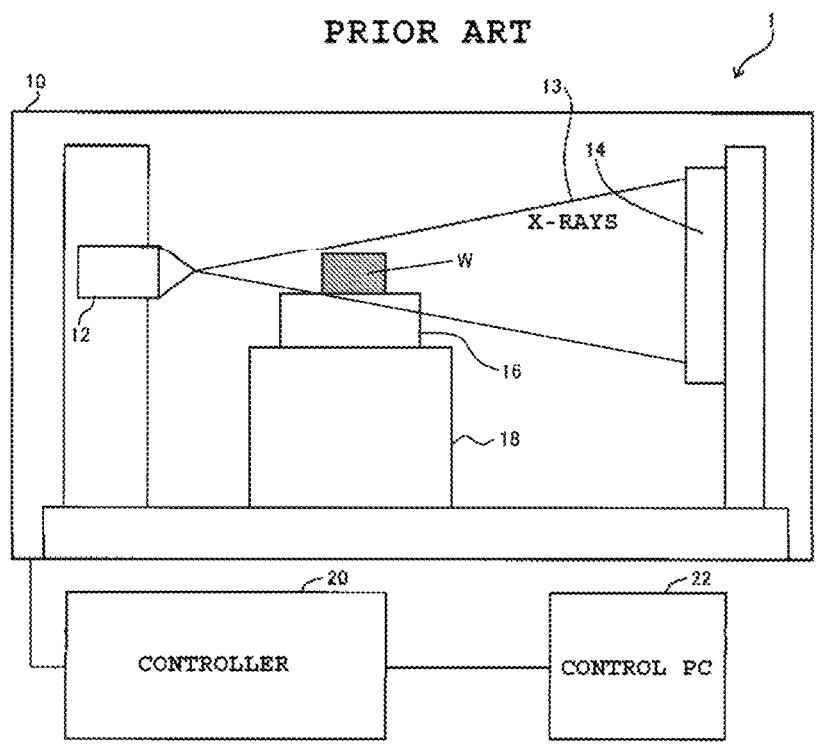
FIG. 1 is a sectional view showing an overall configuration of a typical X-ray CT apparatus used for measurement.
Figure 2:
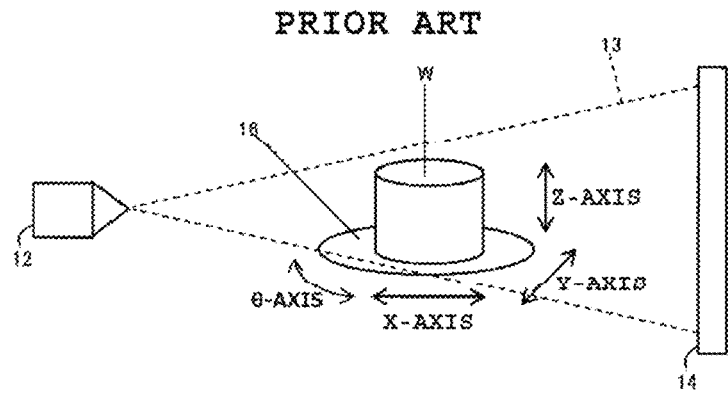
FIG. 2 is a perspective view showing an arrangement of essential parts of the same.
Figure 3:
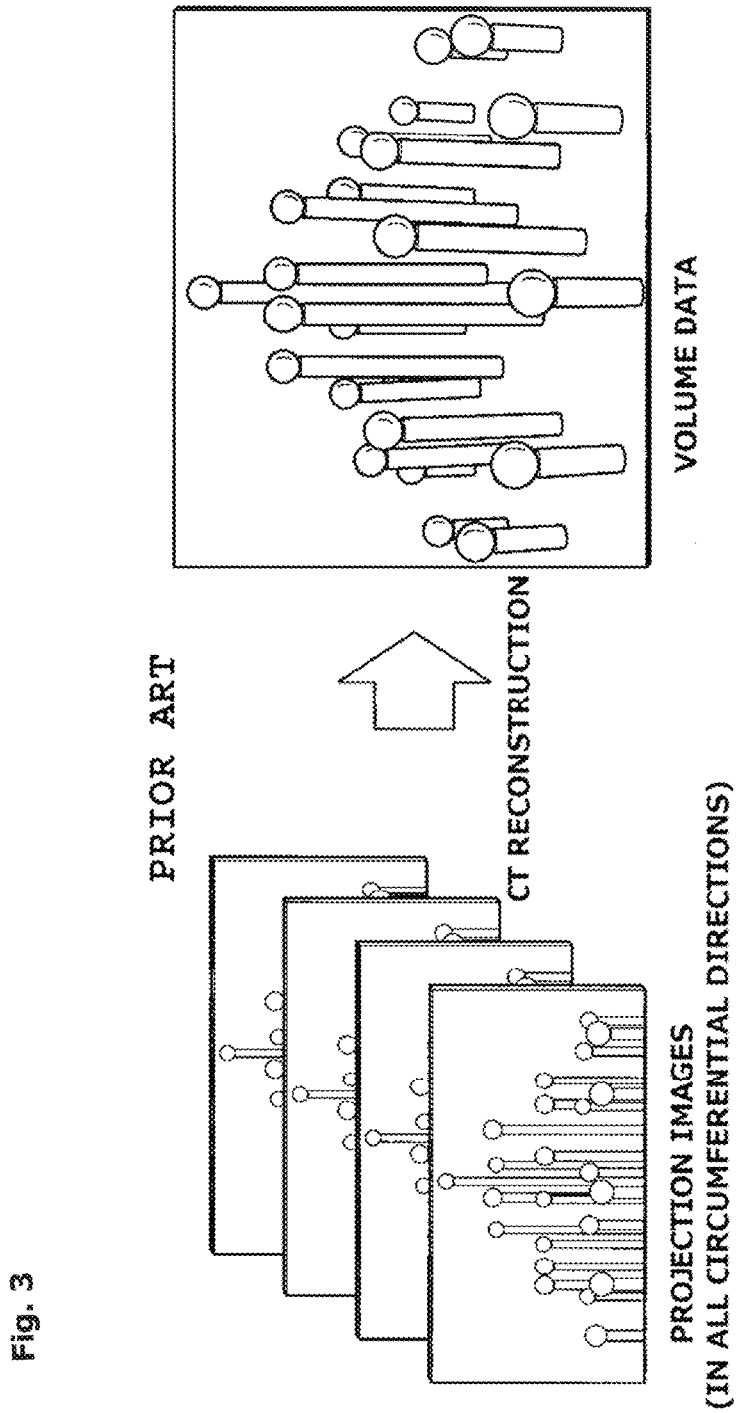
FIG. 3 is a diagram showing an outline of CT reconstruction by the same.

Specifically, in step 100 of FIG. 6, projection images of an object to be measured W are obtained by using an X-ray CT apparatus 1 such as shown in FIG. 1. Specifically, as shown in FIG. 2, the object to be measured W is placed on a rotating table 16. Transmission images are obtained while changing the angle of the object to be measured W. The angle is changed in about 10 to 50 levels. The angular intervals do not need to be constant. The number of levels may theoretically be two. After the acquisition of the transmission images, the transmission images are logarithmically converted into respective projection images. By contrast, about 800 to 2000 projection images have conventionally been needed.

Next, the processing proceeds to step 110. In step 110, the barycentric positions of the respective projection images are calculated. A projection value p of a projection image is the integral of the amounts of linear attenuation when the X-ray 13 is transmitted through the object to be measured W. If the object to be measured W is made of a single material, the pixel value therefore corresponds to mass.

Figure 7:
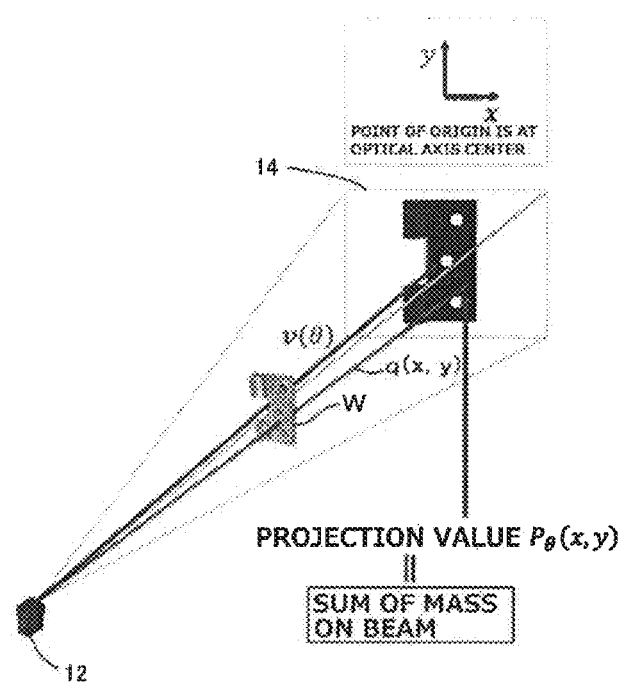
FIG. 7 is a perspective view for describing a method for calculating the barycentric position of a projection image according to the embodiment.

As illustrated in FIG. 7, x- and y-axes are set on a projection image. A three-dimensional vector from an X-ray source 12 to a pixel on an X-ray detector 14 will be denoted by q(x, y). A three-dimensional vector v(θ) from the X-ray source 12 to the barycenter of the projection image can be determined by taking a weighted average of three-dimensional vectors p (x, y) and projection values $P_\theta$(x, y) by the following equation:

[Eq. 3]
$$v(\theta) = \frac{\int P_\theta(x, y) q(x, y) dx dy}{\int P_\theta(x, y) dx dy} \quad (3)$$

Deviations of the X-ray source 12 and errors in the projection image due to the cone beam can thereby be taken into account.

Figure 8:
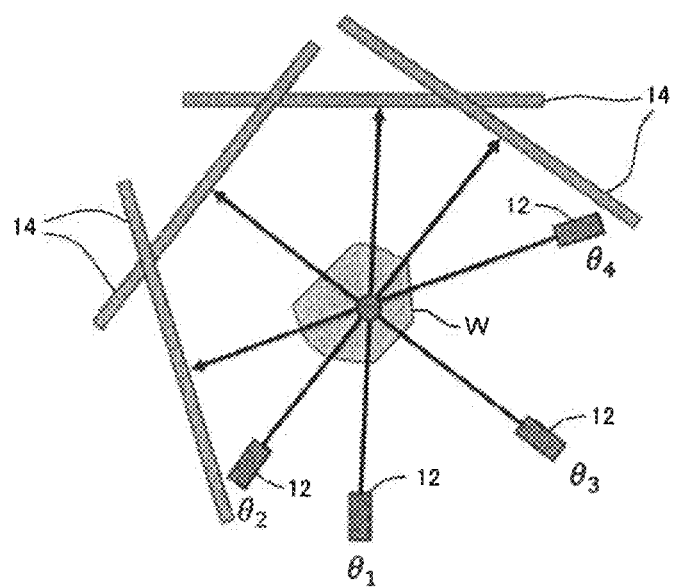
FIG. 8 is a plan view showing calculation of a three-dimensional barycentric position according to the embodiment.

Next, the processing proceeds to step 120. In step 120, a three-dimensional barycentric position is calculated by using the barycentric positions of the respective projection images. Assume that the object to be measured W is fixed and the X-ray source 12 and the X-ray detector 14 are rotated. As illustrated in FIG. 8, line segments connecting the X-ray source 12 and the barycenters of the respective projection images (the calculation results in step 110) intersect at a point, the position of which is the three-dimensional barycentric position of the object to be measured W. While the line segments theoretically intersect at a point, the actual calculations may fail to intersect at a point. In such a case, a nearest point calculated by the least squares method can be used.

Figure 9:
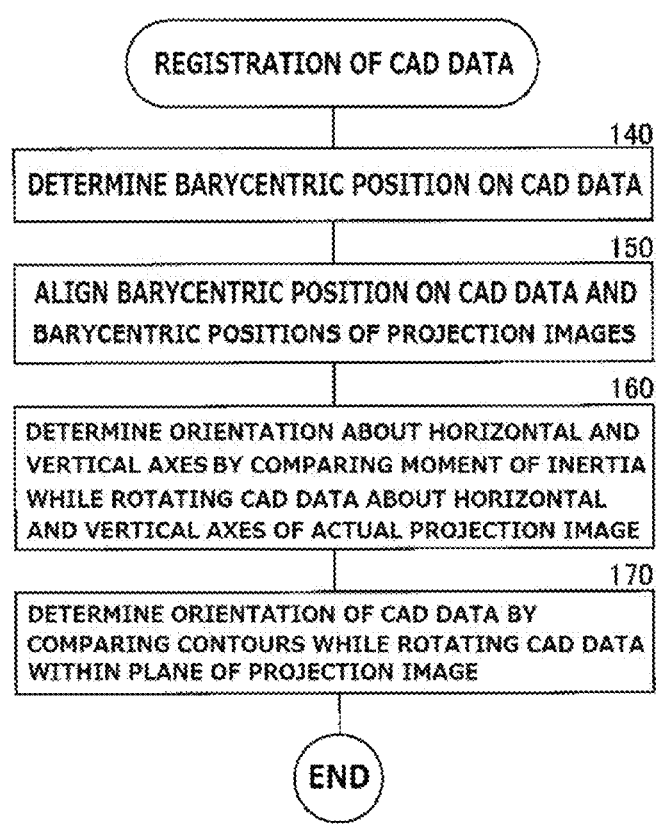
FIG. 9 is a flowchart showing a procedure for registering CAD data according to the embodiment.

Next, the processing proceeds to step 130. In step 130, registration of the CAD data is performed. Specifically, as shown in FIG. 9, a barycentric position on the CAD data is initially determined in step 140.

Figure 10:
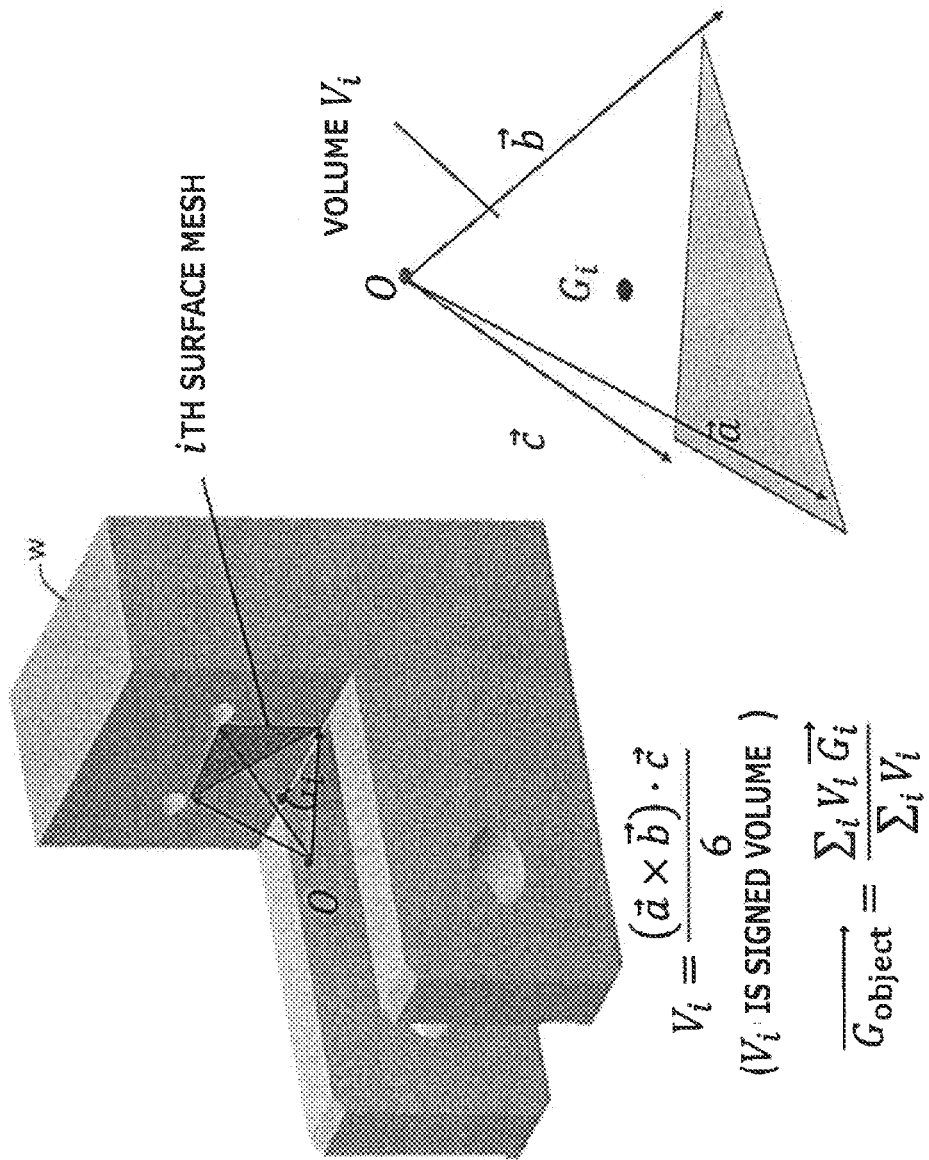
FIG. 10 is a diagram for describing a method for calculating the barycentric position of a CAD model according to the embodiment.

As shown in FIG. 10, for all mesh triangles, assume a set of triangular pyramids with an arbitrary point O as apexes and the respective triangles as bases.

A signed volume $V_i$ of each triangular pyramid is determined by the following Eq. (4), and the barycenter $G_i$ of the triangular pyramid is determined as well:

[Eq. 4]
$$V_i = \frac{(\vec{a} \times \vec{b}) \cdot \vec{c}}{6} \quad (4)$$

$$\vec{G_{object}} = \frac{\sum_i V_i \vec{G_i}}{\sum_i V_i} \quad (5)$$

After the calculation of the volumes $V_i$ and the barycenters $G_i$ for all the triangles, a weighted average of the volumes V and the barycenters $G_i$ is determined as expressed by Eq. (5). The resulting weighted average is assumed as the barycenter of the CAD model. The reason is that the barycenter would deviate depending on the mesh size if vertex coordinates were simply averaged. Such a technique is then used, taking volumes into account.

The barycenter can be determined, for example, by using solid model (not surface model) 3D-CAD software if the reliability of barycentric calculation by the software is high.

Next, in step 150, the barycentric position on the CAD data and the baryoentric positions of the actual projection images are aligned so that a projection image of the CAD data (CAD projection image) can be calculated each time the CAD data is rotated.

Figure 11:
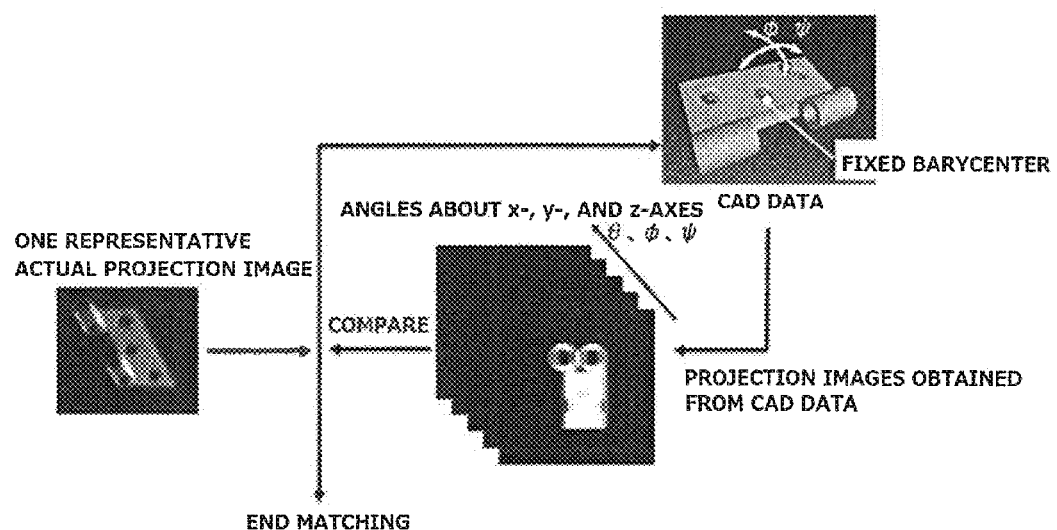
FIG. 11 is a diagram showing how projection images obtained from the CAD data are matched with an actual projection image according to the embodiment.

Specifically, as illustrated in FIG. 11, an arbitrary representative projection image is selected from the actual projection images. The CAD data is rotated about the barycenter so that the orientation of the actual projection image coincides with that of the CAD projection image. In FIG. 11 θ, Φ and Ψ represent the angles about the x-, y-, and z axes, respectively.

A method for rotating the CAD data will be described. As illustrated in step 160 of FIG. 9, orientation about horizontal and vertical, two rotation axes is initially determined, for example, by comparing moment of inertial while rotating the CAD data about the horizontal and vertical axes of the actual projection image.

Specifically, while rotating the CAD data about the horizontal (y) and vertical (z) axes (in FIGS. 11, Φ and Ψ), the moment of inertia I at each rotation angle is calculated by the following equation:

[Eq. 5]

$$1 = \int P_\theta(x,y)(x^2+y^2)dxdy \quad (6)$$

The value is compared with the moment of inertia of the actual projection image.

The values of the moment of inertia coincide when the orientation of the CAD data about the horizontal and vertical axes coincides with that of the actual projection image.

Once the orientation of the CAD data with respect to the representative actual projection image is determined, the orientation of the CAD data with respect to other actual projection images can be calculated from angular information during acquisition of the representative actual projection image.

Figure 12:
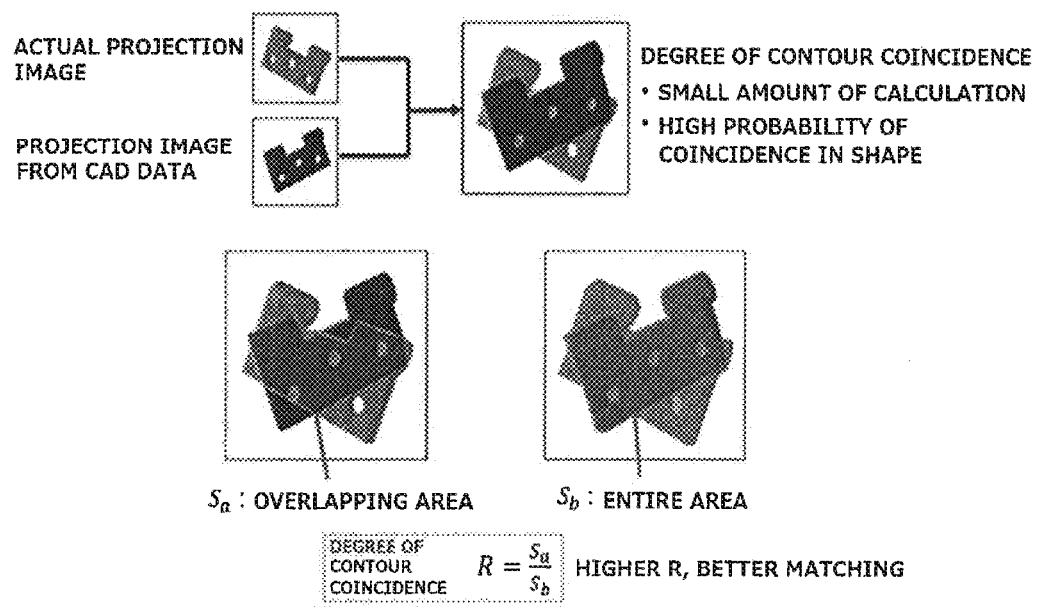
FIG. 12 is a diagram showing a state in which contours are compared according to the embodiment.

Next, in step 170, contours are compared as shown in FIG. 12 while rotating the CAD data within the plane of the projection image. In contour calculation, the orientation of the actual projection image and that of the CAD projection image are aligned by calculating a degree of contour coincidence R indicating the degree of overlap therebetween, given by the following equation:

[Eq. 6]

$$R = S_a/S_b \quad (7)$$

where $S_a$ is an overlapping area, and $S_b$ is an entire area.

The higher the degree of contour coincidence R, the better the matching. By using the degree of contour coincidence R, the orientation having a high probability of coincidence in shape can thus be calculated with a small amount of calculation.

The captured images and the CAD data are registered as described above. The orientation can be precisely aligned by performing the orientation alignment by a combination of the method using the moment of inertia and the method using the contours as described above. The orientation alignment can be performed by using either one of the methods.

Next, the processing proceeds to step 200 of FIG. 6. In step 200, the thickness of the object to be measured W made of a single material is precisely measured by using a projection image.

Figure 13:
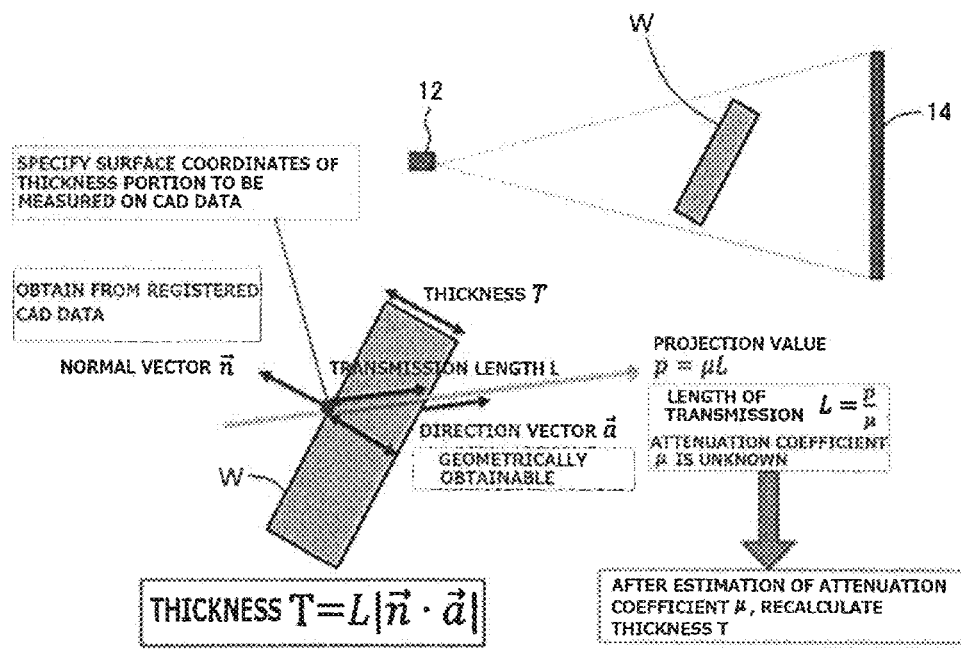
FIG. 13 is a diagram showing a state in which a thickness is measured by using a projection image according to the embodiment.

The object to be measured W and the CAD data have been registered by the processing up to step 130. If the effect of beam hardening by the X-rays is ignored, as illustrated in FIG. 13, the thickness T at a measurement point can be expressed by using the projection value p at the measurement point, an attenuation coefficient µ (unknown), and the normal vector n and the X-ray direction vector a to the surface at the measurement point as follows:

[Eq. 7]

$$T = \frac{p}{\mu}|\vec{n}\cdot\vec{a}| = L|\vec{n}\cdot\vec{a}| \quad (8)$$

where L is the length of transmission (referred to as transmission length) $L = p/\mu$.

The thickness T can therefore be calculated from Eq. (8) if the attenuation coefficient µ can be determined.

Figure 14:
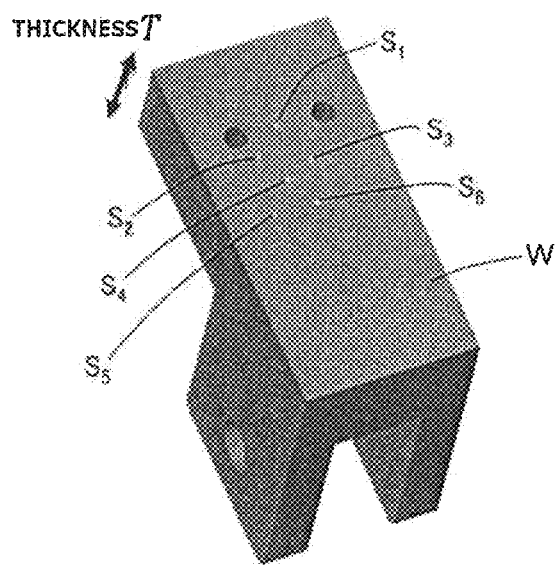
FIG. 14 is a perspective view showing examples of measurement points according to the embodiment.

As illustrated in FIG. 14, a plurality of measurement points $S_1, \ldots, S_i$ (in FIG. 14, i=6) having the same known thickness I are arbitrarily set. The attenuation coefficient µ is determined so that differences between calculated thicknesses at the measurement points and a design value $T_0$ decrease.

Figure 15:
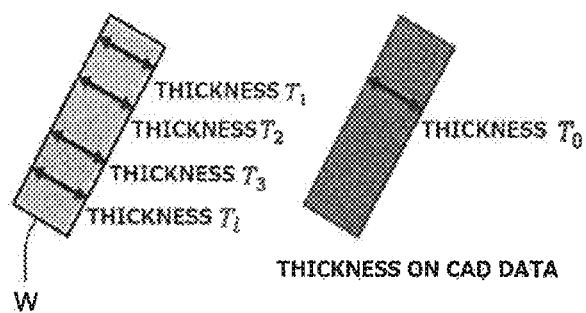
FIG. 15 is a sectional view showing an example of a relationship in thickness between the object to be measured and the CAD data according to the embodiment.

Specifically, in step 200 of FIG. 6, as illustrated in FIG. 15, thicknesses $T_1, T_2, \ldots, T_i$ at a plurality of points having the same thickness $T_0$ on the CAD data are measured. The thicknesses include the unknown µ.

In step 210, the attenuation coefficient µ is estimated so that the differences from the thickness on the CAD data decrease, for example, by using the least squares method as follows:

[Eq. 8]

$$E = \sum_i (T_0 - T_i)^2 \to \min \quad (9)$$

$$E = \sum_i \left(T_0 - \frac{p_i}{\mu}|\vec{n}\cdot\vec{a}|\right)^2 = \sum_i (T_0 - \alpha p_i|\vec{n}\cdot\vec{a}|)^2 \quad (10)$$

$$\left(\alpha = \frac{1}{\mu}\right)$$

$$\frac{\partial E}{\partial \alpha} = -\sum_i 2p_i(T_0 - \alpha p_i|\vec{n}\cdot\vec{a}|) = 0 \quad (11)$$

$$\alpha = \frac{T_0 \sum_i p_i}{\sum_i p_i^2|\vec{n}\cdot\vec{a}|}$$

$$\mu = \frac{1}{\alpha} = \frac{\sum_i p_i^2|\vec{n}\cdot\vec{a}|}{T_0 \sum_i p_i}$$

In step 220, the thickness measurement value T can be calculated from the estimated attenuation coefficient µ:

[Eq. 9]

$$T = \text{average}(T_1, T_2, \ldots, T_i) \quad (12)$$

After the attenuation coefficient µ is thus estimated, the thickness T at a given measurement point can be determined.

The actual attenuation coefficient µ varies due to the effect of beam hardening. The greater the transmission length L, the lower the attenuation coefficient µ. The foregoing linearity between L and µ is therefore not maintained, and the pixel value becomes lower that for the transmission length.

Transmission lengths L are then expressed by a function f of p. Specifically, several pieces of projection image data (representative projection image group) are selected for the registered CAD data, and combinations of all the projection values in the representative projection image group with transmission lengths estimated from the CAD data are obtained. The relationship between the obtained projection values and the group of pieces of data about the transmission lengths is approximated by using the function f.

For example, the function f can be expressed by the following polynomial:

[Eq. 10]

$$L = f(p) = w_1*p + w_2*p^2 + w_3*p^3 \ldots w_n*p^n = \Sigma(w_n*p^n) \quad (13)$$

Here, the unknown constants $w_n$ can be estimated by using the least squares method, for example.

A plurality of known measurement points $S_1, \ldots, S_i$ are arbitrarily set, and the function f is determined so that differences between the calculated thicknesses at the measurement points and the design value $T_0$ decrease. Specifically, the function f is determined so that differences from the thickness on the CAD data decrease, for example, by using the least squares method as follows:

[Eq. 11]

$$E=\Sigma(T_{0i}-T_i)^2 \to \min \quad (14)$$

$$T_i=L*|\vec{n}\cdot\vec{a}|=f(p)*|\vec{n}\cdot\vec{a}| \quad (15)$$

The function f is not limited to a polynomial.

Figure 16:
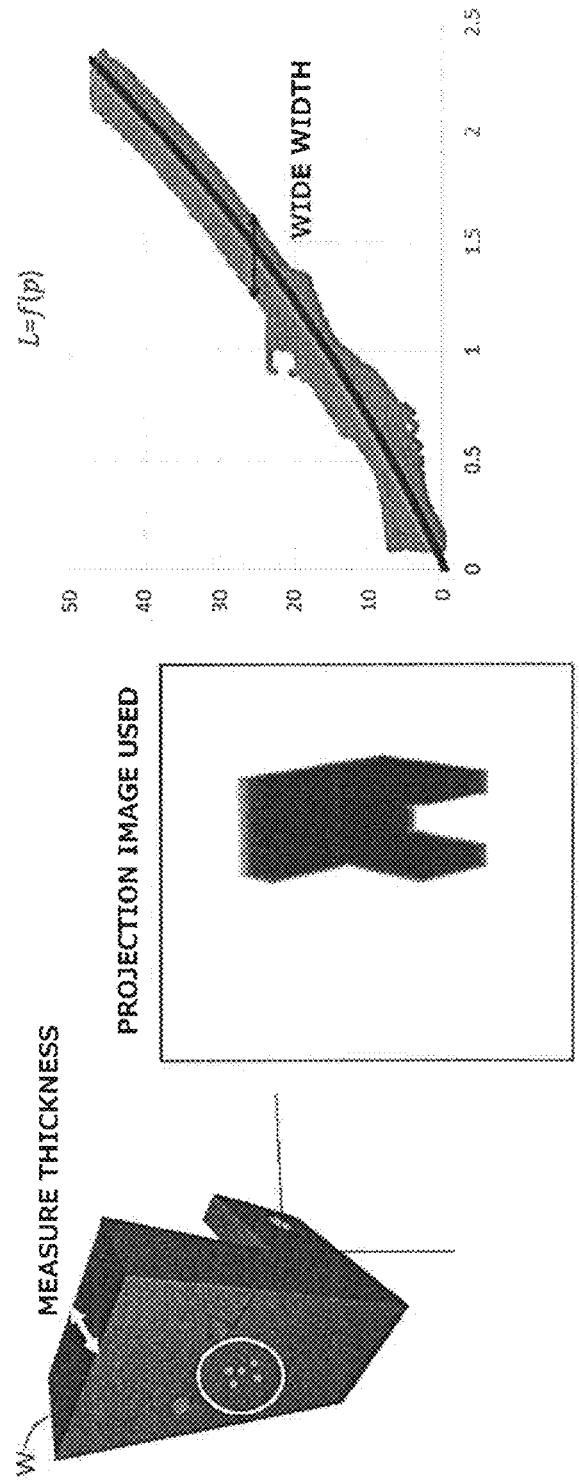
FIG. 16 is a diagram showing an experimental result according to the embodiment.

FIG. 16 shows an experimental result. The relational formula between the projection value and the transmission length determined by the foregoing method was:

[Eq. 12]

$$L=f(p)=13.086914p+2.244019p^2+0.321014p^3 \quad (16)$$

Applying the formula to five measurement points having a thickness of 20.05 to 20.07 mm yielded an average of 21.36 mm, where the measurement values at the five measurement points were 21.386114 mm, 21.242886 mm, 21.446529 mm, 21.360237 mm, and 21.367506 mm.

In the foregoing embodiment, the present invention is applied to the measurement of a work. However, the object to be measured is not limited to a work.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. A dimension measurement method using a projection image obtained by an X-ray CT apparatus, the dimension measurement method, in measuring a dimension of an object to be measured made of a single material, comprising:
    obtaining a plurality of transmission images of the object of a single material to be measured by using the X-ray CT apparatus, and then generating respective projection images;
    obtaining Computer Aided Design data used in designing the object to be measured;
    registering the projection images with Computer Aided Design data used in designing the object to be measured, by:
        determining positions of the object to be measured in the respective projection images;
        calculating a three-dimensional position of the object to be measured by using the determined positions of the object to be measured in the respective projection images;
        determining a position of the object to be measured on the Computer Aided Design data;
        making the positions of the projection images determined from the respective projection images coincide with respective positions of the Computer Aided Design data; and
        calculating the dimension of the object to be measured by using a relationship between the registered Computer Aided Design data and the projection images.

2. A dimension measurement method using a projection image obtained by an X-ray CT apparatus, the dimension measurement method, in measuring a dimension of an object to be measured made of a single material, comprising:
    obtaining a plurality of transmission images of the object to be measured by using the X-ray CT apparatus, and then generating respective projection images;
    registering the projection images with Computer Aided Design data used in designing the object to be measured by:
        determining positions of the object to be measured in the respective projection images;
        calculating a three-dimensional position of the object to be measured by using the determined positions of the object to be measured in the respective projection images;
        determining a position of the object to be measured on the Computer Aided Design data;
        making the positions of the projection images determined from the respective projection images coincide with respective positions of the Computer Aided Design data;
        calculating the dimension of the object to be measured by using a relationship between the registered Computer Aided Design data and the projection images;
        selecting a representative projection image group for the registered Computer Aided Design data;
        obtaining combinations of all projection values in the representative projection image group with transmission lengths estimated from the Computer Aided Design data; and
        calculating the dimension of the object to be measured by using a relationship between the obtained projection values and the estimated transmission lengths.

3. The dimension measurement method according to claim 1, further comprising:
    determining an attenuation coefficient of X-rays by using the registered Computer Aided Design data so that a difference between a calculated thickness at a measurement point having a known thickness and a design value decreases; and
    calculating the dimension of the object to be measured by using the attenuation coefficient.

4. A dimension measurement method using a projection image obtained by an X-ray CT apparatus, the dimension measurement method, in measuring a dimension of an object to be measured made of a single material, comprising:
    obtaining a plurality of transmission images of the object to be measured by using the X-ray CT apparatus, and then generating respective projection images;
    registering the projection images with CAD data used in designing the object to be measured by:
        determining barycentric positions of the object to be measured in the respective projection images;
        calculating a three-dimensional barycentric position of the object to be measured by using the determined barycentric positions of the object to be measured in the respective projection images;
        determining a barycentric position of the object to be measured on the CAD data;
        making the barycentric positions of the object to be measured determined from the respective projection images coincide with the barycentric position of the object to be measured on the CAD data; and
        rotating the CAD data so that orientation of the object to be measured in one of the projection images matches that of the object to be measured on the CAD data; and
    calculating the dimension of the object to be measured by using a relationship between the registered CAD data and the projection images.

5. The dimension measurement method according to claim 4, wherein the barycentric position of the object to be measured on the CAD data is determined by assuming, for all mesh triangles, a set of triangular pyramids with a given point as apexes and the respective triangles as bases, and taking a weighted average of volumes and barycenters of the respective triangular pyramids.

6. The dimension measurement method according to claim 4, wherein the barycentric position of the object to be measured on the CAD data is determined by using a solid model 3D-CAD software.

7. The dimension measurement method according to claim 4, wherein orientation alignment by rotation of the CAD data is performed by determining orientation about axes of the projection image by comparing moment of inertial while rotating the CAD data about the axes.

8. The dimension measurement method according to claim 7, wherein the axes are a horizontal axis and a vertical axis.

9. The dimension measurement method according to claim 4, wherein orientation alignment by rotation of the CAD data is performed by rotating the CAD data so that contours coincide.

10. The dimension measurement method according to claim 9, wherein the coincidence of the contours is determined from R=Sa/Sb of a ratio R of an overlapping area Sa to an entire area Sb.

11. The dimension measurement method according to claim 4, wherein
orientation alignment by rotation of the CAD data is performed by:
initially determining orientation about horizontal and vertical axes of the projection image by comparing moment of inertial while rotating the CAD data about the horizontal and vertical axes, and
then rotating the CAD data within a plane of the projection image so that contours coincide.

12. The dimension measurement method according to claim 11, wherein the coincidence of the contours is determined from R=Sa/Sb of a ratio R of an overlapping area Sa to an entire area Sb.

* * * * *